Sept. 22, 1953  R. H. GRANT  2,652,868
BARK-REMOVING TOOL HAVING OPPOSITELY
ROTATING TOOTHED ROLLERS
Filed Oct. 10, 1952  2 Sheets-Sheet 1
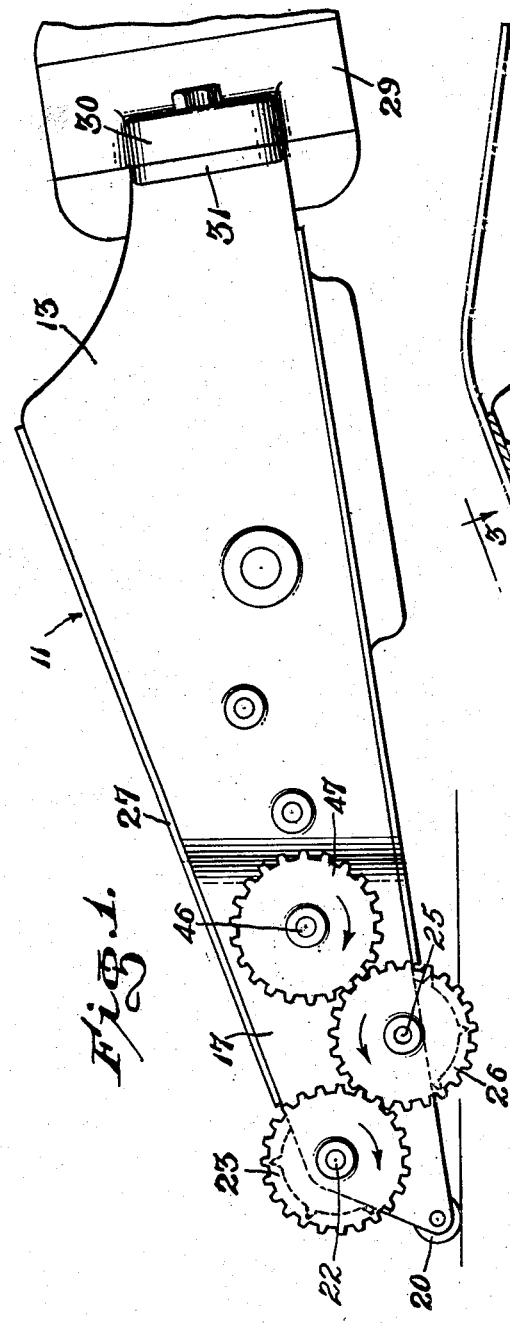
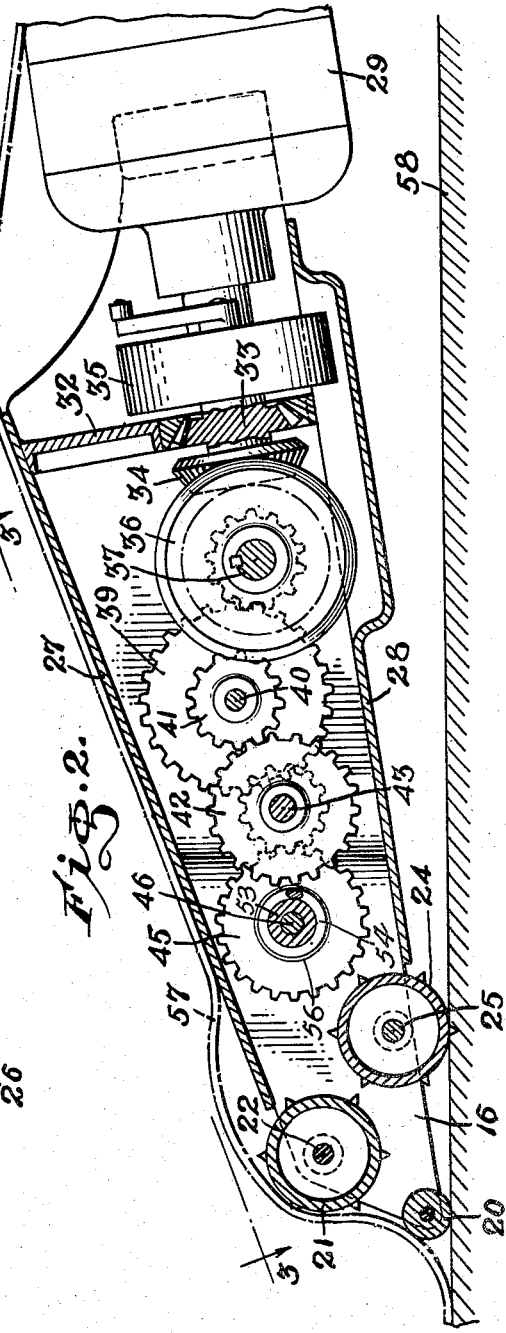
INVENTOR.
Reginald H. Grant,
BY
McMorrow, Berman & Davidson
ATTORNEYS.

Sept. 22, 1953   R. H. GRANT   2,652,868
BARK-REMOVING TOOL HAVING OPPOSITELY
ROTATING TOOTHED ROLLERS
Filed Oct. 10, 1952   2 Sheets-Sheet 2
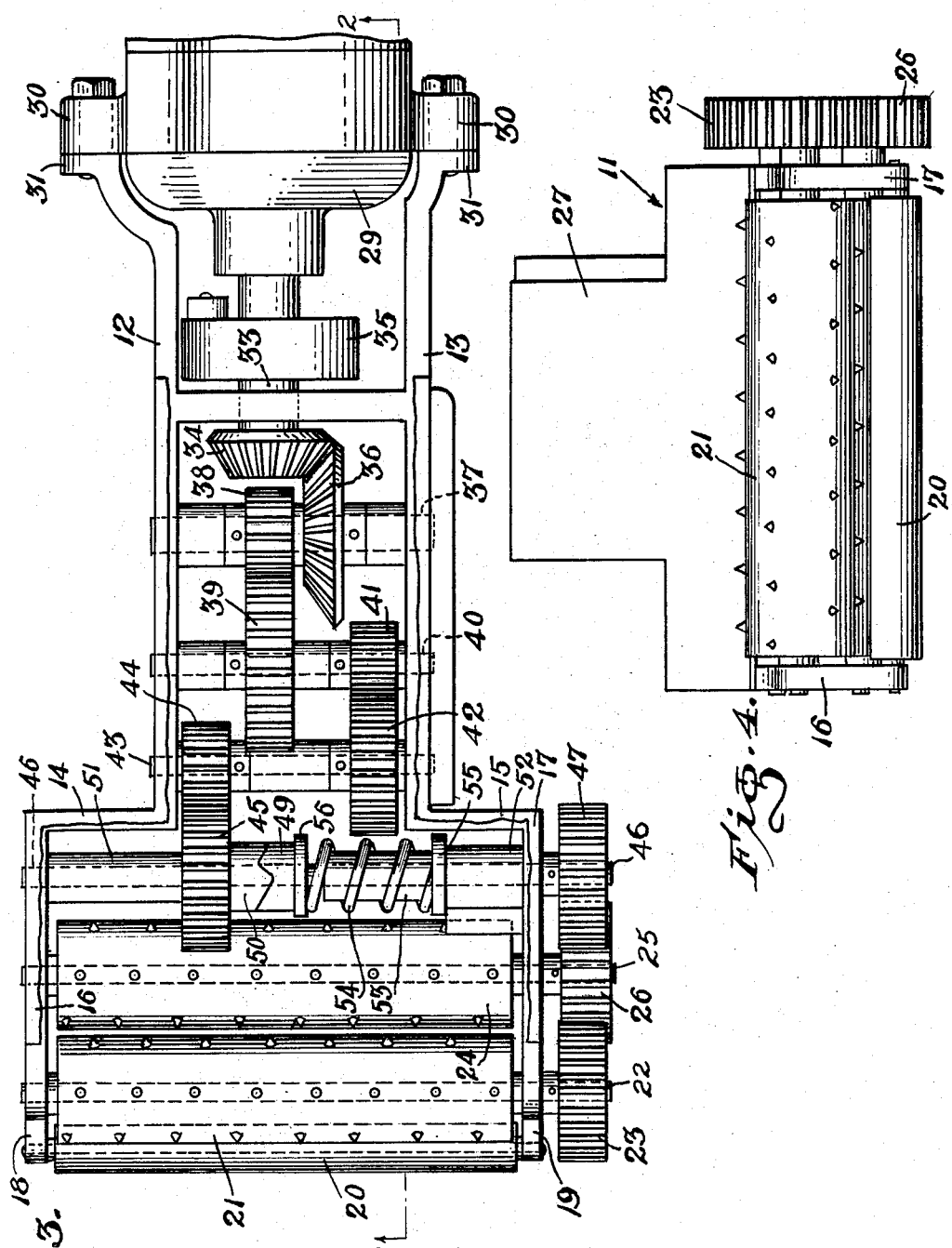
INVENTOR.
Reginald H. Grant,
BY
McMorrow, Berman & Davidson
ATTORNEYS.

Patented Sept. 22, 1953

2,652,868

UNITED STATES PATENT OFFICE 2,652,868

BARK-REMOVING TOOL HAVING OPPOSITELY ROTATING TOOTHED ROLLERS

Reginald H. Grant, Somes Bar, Calif.

Application October 10, 1952, Serial No. 314,094

3 Claims. (Cl. 144—208)

This invention relates to bark peeling machines, and more particularly to a power driven bark peeling machine which is particularly suitable for peeling the bark from Redwood trees or the like.

The main object of the invention is to provide a novel and improved bark peeling machine which is simple in construction, which is relatively light in weight, which is compact in size, and which cleanly and rapidly peels the bark from a tree.

A further object of the invention is to provide an improved bark peeling machine which involves inexpensive components, which is sturdy in construction, which is easy to manipulate, and which provides a great saving in time and labor in the peeling of bark from Redwood trees and the like.

Further objects and advantages of the invention will become apparent from the following description and claims, and from the accompanying drawings, wherein:

Figure 1 is a side elevational view of an improved bark peeling machine constructed in accordance with the present invention.

Figure 2 is a vertical longitudinal cross sectional view of the bark peeling machine of Figure 1, and is taken on the line 2—2 of Figure 3.

Figure 3 is a top plan view, with parts broken away, of the machine of Figures 1 and 2, said view being taken on the line 3—3 of Figure 2, and showing the internal arrangement of the gears and rollers of the bark peeling machine.

Figure 4 is a left end elevational view of the bark peeling machine of Figures 1, 2 and 3.

Referring to the drawings, the bark peeling machine is designated generally at 11 and comprises a frame structure including a pair of side walls 12 and 13 which are in parallel relationship and which are outwardly offset respectively at 14 and 15 and which are provided with the longitudinally extending end portions 16 and 17 which are likewise in parallel relationship.

The wall portions 16 and 17 are tapered downwardly toward their ends, as shown at 18 and 19. Designated at 20 is a transversely extending smooth roller which is journaled between the tapered end portions 18 and 19 of the forward wall sections 16 and 17, said roller projecting beyond the end of the frame by a short distance, as is clearly shown in Figure 1. Designated at 21 is a first toothed roller of substantially larger diameter than the roller 20, said toothed roller 21 being journaled between the ends of the wall sections 16 and 17 at a location spaced above and rearwardly of the roller 20 and projecting upwardly from the top plane of the frame in the manner shown in Figure 2. Roller 21 is secured on a transverse shaft 22 which is journaled in the wall sections 16 and 17. Secured to the end of the shaft 22 adjacent the wall section 19 is the gear 23. Designated at 24 is a second toothed roller which is secured on a transverse shaft 25 journaled in the wall sections 16 and 17 below and rearwardly of the roller 21, the roller 24 projecting below the bottom plane of the frame of the machine, as shown in Figure 2. Secured on the end of the shaft 25 adjacent the wall section 17 is a gear 26 which is in meshing relationship with the gear 23, as shown in Figure 1.

Secured to the top margins of the side wall elements of the frame is the top cover plate 27 which terminates adjacent the upper toothed roller 21. Secured to the bottom edges of the side walls of the frame of the machine is the bottom cover plate 28 which terminates adjacent the lower toothed roller 24, as shown in Figure 2. The frame has a shape which flares rearwardly in height, as shown in Figures 1 and 2, the rear portion of the frame being constant in width, since the walls 12 and 13 are parallel.

Designated at 29 is an electric motor which is provided with respective laterally extending mounting flanges 30, 30, said mounting flanges being bolted to outwardly extending flanges 31, 31 provided on the walls 12 and 13, whereby the motor is secured to the frame of the machine with its shaft extending longitudinally. Transversely secured in the frame is the partition wall 32 in which is journaled a shaft 33 carrying the bevel gear 34. Shaft 33 is connected to the shaft of motor 29 through a conventional speed responsive clutch 35 which may be of the conventional centrifugal type which couples the shaft 33 to the shaft of the motor 29 in response to the attainment of a predetermined speed by the motor shaft. The details of the clutch device 35 form no part of the present invention.

Bevel gear 34 meshes with a mating bevel gear 36 mounted on a transverse shaft 37 journaled in the parallel side walls 12 and 13. Shaft 37 has secured thereon a smaller pinion gear 38 which meshes with a relatively large gear 39 mounted on a shaft 40 journaled transversely in the walls 12 and 13 forwardly of the shaft 37. Secured on the shaft 40 is a relatively small pinion gear 41 which meshes with a larger gear 42 mounted on a transverse shaft 43 journaled in the walls 12 and 13 forwardly on the shaft 40. Shaft 43 has secured thereon a relatively small pinion gear 44 which meshes with a relatively large gear 45 rotatably mounted on a transverse shaft 46 journaled between the forward, outwardly offset side wall sections 17 and 18. Secured on the shaft 46 adjacent the well section 17 is the gear 47 which is in mesh with gear 26, as shown in Figure 1.

Keyed to the shaft 46 for sliding movement therealong is the toothed clutch segment 49 having clutch teeth which are engageable with a toothed sleeve 50 secured to the gear 45, as by being integrally formed on a sleeve 51 on which the gear 45 is integrally formed, or to which said gear 45 is rigidly connected in any suitable manner, the sleeve 51 bearing rotatively against the wall section 16, as shown in Figure 3. Adjacent the wall section 17, the shaft 46 extends through a bearing element 52 secured to the wall section 17 and formed with a sleeve portion 53.

Designated at 54 is a coiled spring surrounding the sleeve 53 and bearing between a washer 55 abutting the end of the bearing member 52 at the shoulder defined thereon adjacent the sleeve 53, and between the flanged end 56 of the toothed clutch sleeve 49. The spring 54 biases the clutch sleeve 49 into interlocking engagement with the toothed sleeve 50, whereby the gear 45 is drivingly coupled to shaft 46 for transmitting torque in a clockwise direction from gear 45 to shaft 46, as viewed in Figure 2, but allowing the shaft 46 to rotate clockwise relative to gear 45 when said gear 45 is in a stationary position, as when the motor 29 is deenergized.

When the motor 29 is energized, the gear 45 is driven clockwise, as viewed in Figure 2, with a considerable speed reduction, as compared with the speed of the shaft of the motor, through the gears 34, 36, 38, 39, 41, 42 and 45. Clockwise rotation of shaft 46, as viewed in Figure 1, causes the gear 47 to drive gear 26 counter clockwise, which in turn drives gear 23 clockwise. Thus, the toothed roller 24 is driven counter clockwise, while the toothed roller 21 is simultaneously driven clockwise.

In using the machine, the bark, shown at 57 in Figure 2 is first manually separated from the tree trunk 58 for a sufficient distance to allow the forward end of the machine to be inserted between the bark and the trunk. As shown in Figure 2, the roller 20 engages between the bark and the tree trunk at the forwardmost end of the machine and exerts a prying action on the bark as the machine is advanced. The toothed rollers 21 and 24 respectively exert a gripping action on the bark and on the tree trunk which urges the machine forwardly and causes the bark to be progressively stripped from the tree trunk as the machine advances. The bark is thus smoothly and rapidly stripped from the trunk with only a minimum amount of effort required on the part of the operator, the operator being merely required to guide the machine in its true direction, and the force required to strip the bark being provided by the electric motor 29 acting on the toothed rollers 21 and 24 in the manner above described. When it is desired to retract the machine from between the bark 57 and the trunk 58 for any reason, it is merely necessary to pull the machine rearwardly, since the teeth on the clutch elements 49 and 50 are designed to slip relative to each other when the direction of rotation of the rollers 21 and 24 is reversed.

While a specific embodiment of an improved bark peeling machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a machine for peeling bark, a frame including a pair of side walls having parallel tapered end portions, a transverse smooth roller journaled between the ends of said side walls, a first toothed roller journaled transversely in said side walls above and rearwardly of said smooth roller and projecting outwardly from the top and front edges of said side walls, a second toothed roller journaled between said side walls rearwardly and below said first toothed roller and projecting downwardly with respect to the bottom edges of said side walls, driving means mounted on said frame, and means drivingly coupling said toothed rollers to said driving means.

2. In a machine for peeling bark, a frame including a pair of side walls having parallel tapering end portions, a transverse smooth roller journaled between the ends of said side walls, a first toothed roller journaled transversely in said side walls above and rearwardly of said smooth roller and projecting outwardly from the top and front edges of said side walls, a second toothed roller journaled between said side walls rearwardly and below said first toothed roller and projecting downwardly with respect to the bottom edges of said side walls, and means whereby said toothed rollers are driven simultaneously in opposite directions.

3. In a machine for peeling bark, a frame including a pair of side walls having parallel tapering end portions, a transverse smooth roller journaled between the ends of said side walls, a first toothed roller journaled transversely in said side walls above and rearwardly of said smooth roller and projecting outwardly from the top and front edges of said side walls, a second toothed roller journaled between said side walls rearwardly and below said first toothed roller and projecting downwardly with respect to the bottom edges of said side walls, an electric motor mounted on said frame, gear means coupling said toothed rollers together for simultaneous rotation in opposite directions, and further gear means drivingly coupling said electric motor to said gear means coupling said toothed rollers.

REGINALD H. GRANT.

References Cited in the file of this patent

UNITED STATES PATENTS

| Number | Name | Date |
|---|---|---|
| 2,637,357 | Johnson et al. | May 5, 1953 |